(12) United States Patent
Hasegawa et al.

(10) Patent No.: US 11,745,561 B2
(45) Date of Patent: Sep. 5, 2023

(54) HEAT MANAGEMENT DEVICE

(71) Applicants: TOYOTA JIDOSHA KABUSHIKI KAISHA, Toyota (JP); SUBARU CORPORATION, Tokyo (JP)

(72) Inventors: Yoshio Hasegawa, Toyota (JP); Hiroki Tashiro, Nisshin (JP); Makoto Ikegami, Obu (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 70 days.

(21) Appl. No.: 17/210,204

(22) Filed: Mar. 23, 2021

(65) Prior Publication Data

US 2021/0309075 A1 Oct. 7, 2021

(30) Foreign Application Priority Data

Apr. 1, 2020 (JP) ................... 2020-065907

(51) Int. Cl.
*B60H 1/00* (2006.01)
*B60H 1/32* (2006.01)
*B60H 1/04* (2006.01)

(52) U.S. Cl.
CPC ........... *B60H 1/00899* (2013.01); *B60H 1/04* (2013.01); *B60H 1/32281* (2019.05); *B60H 2001/00928* (2013.01)

(58) Field of Classification Search
CPC ............ B60H 1/00899; B60H 1/00885; B60H 1/143; F01P 7/14; F01P 2007/146
See application file for complete search history.

(56) References Cited

U.S. PATENT DOCUMENTS

| 11,554,635 | B2 * | 1/2023 | Kinoshita | B60H 1/32284 |
| 2009/0280395 | A1 * | 11/2009 | Nemesh | H01M 10/615 |
| | | | | 429/62 |
| 2013/0139528 | A1 | 6/2013 | Katayama et al. | |
| 2016/0107508 | A1 * | 4/2016 | Johnston | B60H 1/00278 |
| | | | | 237/12.3 A |

(Continued)

FOREIGN PATENT DOCUMENTS

| CN | 103972607 A | * | 8/2014 | ......... B60H 1/00278 |
| CN | 109249775 A | * | 1/2019 | |

(Continued)

*Primary Examiner* — Jenna M Hopkins
(74) *Attorney, Agent, or Firm* — Oliff PLC (57) ABSTRACT

A heat management device may include: a heat circuit comprising a heat exchanger passage, a radiator passage communicating with the heat exchanger passage, and a battery passage communicating with the heat exchanger passage by bypassing the radiator passage; a heat exchanger cooling heat medium by heat exchange; a radiator exchanging heat between outside air and the heat medium in the radiator passage; a control valve changing a channel of the heat medium in the heat circuit; a pump pumping out the heat medium in the heat circuit from the heat exchanger passage to the battery passage and from the heat exchanger passage to the radiator passage; and a controller. The controller may execute: a heating operation for heating the heat medium in the battery passage by a battery; and a circulation operation for cooling the heat medium in the radiator passage by the radiator.

7 Claims, 7 Drawing Sheets

(56) References Cited

U.S. PATENT DOCUMENTS

| | | | |
|---|---|---|---|
| 2017/0106724 A1* | 4/2017 | Porras | H01M 10/44 |
| 2017/0110775 A1* | 4/2017 | Smith | H01M 10/613 |
| 2017/0358833 A1* | 12/2017 | Jalilevand | B60H 1/00885 |
| 2018/0006347 A1* | 1/2018 | Porras | H01M 10/486 |
| 2018/0208014 A1* | 7/2018 | Ben Ahmed | B60H 1/3211 |
| 2018/0264913 A1* | 9/2018 | Enomoto | B60H 1/32284 |
| 2019/0047360 A1* | 2/2019 | Kishita | B60H 1/32284 |
| 2019/0078497 A1 | 3/2019 | Enomoto et al. | |
| 2019/0344640 A1 | 11/2019 | Aikawa et al. | |
| 2020/0108689 A1* | 4/2020 | Karlsson | B60H 1/00278 |
| 2020/0189357 A1* | 6/2020 | Chopard | B60H 1/32281 |
| 2020/0317026 A1* | 10/2020 | Kitamura | B60H 1/00278 |
| 2021/0008951 A1* | 1/2021 | Aikawa | B60H 1/3205 |
| 2021/0080027 A1* | 3/2021 | Schoeneman | B60H 1/00278 |

FOREIGN PATENT DOCUMENTS

| | | | | |
|---|---|---|---|---|
| DE | 112014006161 T5 * | 10/2016 | | B60H 1/00278 |
| DE | 102019109796 A1 * | 12/2019 | | B60H 1/00021 |
| JP | 2012-158197 A | 8/2012 | | |
| JP | 2017-065440 A | 4/2017 | | |
| JP | 2017-150352 A | 8/2017 | | |
| JP | 2019-119369 A | 7/2019 | | |
| JP | 2019-199113 A | 11/2019 | | |
| KR | 102080803 B1 * | 2/2020 | | |
| WO | WO-2016125452 A1 * | 8/2016 | | B60H 1/00899 |

\* cited by examiner

HEAT MANAGEMENT DEVICE

CROSS-REFERENCE TO RELATED APPLICATION(S)

This application claims priority to Japanese Patent Application No. 2020-065907 filed on Apr. 1, 2020, the contents of which are hereby incorporated by reference into the present application.

TECHNICAL FIELD

The technology disclosed herein relates to a heat management device.

BACKGROUND

Japanese Patent Application Publication No. 2017-150352 describes a heat management device to be mounted on a vehicle. The heat management device includes a plurality of heat circuits (a heater circuit, an engine circuit, and the like) in which heat media respectively circulate. For example, the heat management device heats air in a cabin of the vehicle using the heat medium in the heater circuit as a heat source. Moreover, the heat management device cools an engine with the heat medium in the engine circuit. The heat medium in the engine circuit is cooled by a radiator.

SUMMARY

For example, when a temperature of outside air is low or when a temperature of a heat medium in a radiator is low, the radiator may be frosted. Frost on the radiator could be an impediment to heat exchange of the heat medium in the radiator. To remove the frost on the radiator, the radiator is heated to melt the frost. The present disclosure proposes a technology that enables efficient acquisition of heat energy for heating a radiator.

A heat management device disclosed herein may be configured to be mounted on a vehicle. The heat management device may comprise: a heat circuit in which heat medium circulates, the heat circuit comprising a heat exchanger passage, a radiator passage communicating with the heat exchanger passage, and a battery passage communicating with the heat exchanger passage by bypassing the radiator passage; a heat exchanger configured to cool the heat medium in the heat exchanger passage by heat exchange; a battery configured to be cooled by the battery passage; a radiator configured to exchange heat between outside air and the heat medium in the radiator passage; a control valve configured to change a channel of the heat medium in the heat circuit; a pump configured to pump out the heat medium in the heat circuit from the heat exchanger passage to the battery passage and from the heat exchanger passage to the radiator passage; and a controller, wherein the controller is configured to execute: a heating operation by controlling the control valve and the pump such that the heat medium in the heat circuit circulates between the heat exchanger passage and the battery passage so as to heat the heat medium in the battery passage by the battery; and a circulation operation by controlling the control valve and the pump such that the heat medium heated by the heating operation circulates between the heat exchanger passage and the radiator passage so as to cool the heat medium in the radiator passage by the radiator.

According to this configuration, heat energy generated in the battery can be utilized for heating the radiator. This eliminates the need to generate heat energy aiming to heat the radiator in the vehicle.

DETAILED DESCRIPTION

Technological elements of a heat management device disclosed herein will be listed below. The technological elements below are independently useful.

In an aspect of the heat management device disclosed herein, the controller may be configured to prohibit the heating operation in a case where a temperature of the battery is out of a predetermined range, the predetermined range being greater than or equal to 0° C.

Depending on the temperature of the battery, it may be inappropriate to use a heat of the battery for execution of the heating operation. For example, if the battery has a low temperature, the heat medium could not be heated sufficiently in the heating operation. In such a case, execution of the heating operation can be avoided.

In an aspect of the heat management device disclosed herein, the controller may be configured to prohibit the heating operation in a case where the temperature of the battery is less than 15° C. The battery used for the vehicle may decrease in performance in the case where the temperature of the battery is less than 15° C. Prohibiting the heating operation in the case where the temperature of the battery is less than 15° C. thus can avoid hindering the battery from recovering from decrease in performance.

In an aspect of the heat management device disclosed herein, the controller may be configured to prohibit the circulation operation in a case where a temperature of the heat medium in the heat circuit is less than 0° C. In the case where the temperature of the heat medium is less than 0° C., even the execution of the circulation operation cannot melt the frost on the radiator. Prohibiting the circulation operation in the case where the temperature of the heat medium is less than 0° C. thus can avoid unnecessary operation of the heat management device.

The controller may be configured to simultaneously execute the heating operation and the circulation operation by controlling the control valve such that the heat medium in the heat circuit flows from the heat exchanger passage to both the battery passage and the radiator passage. According to this configuration, heating and cooling of the heat medium can be executed simultaneously.

The controller may be configured to alternately execute the heating operation and the circulation operation by controlling the control valve. According to this configuration, separately executing the heating operation and the circulation operation enables appropriate switching between the heating operation and the circulation operation in accordance with the temperature of the heat medium and the like.

First Embodiment

Figure 1:
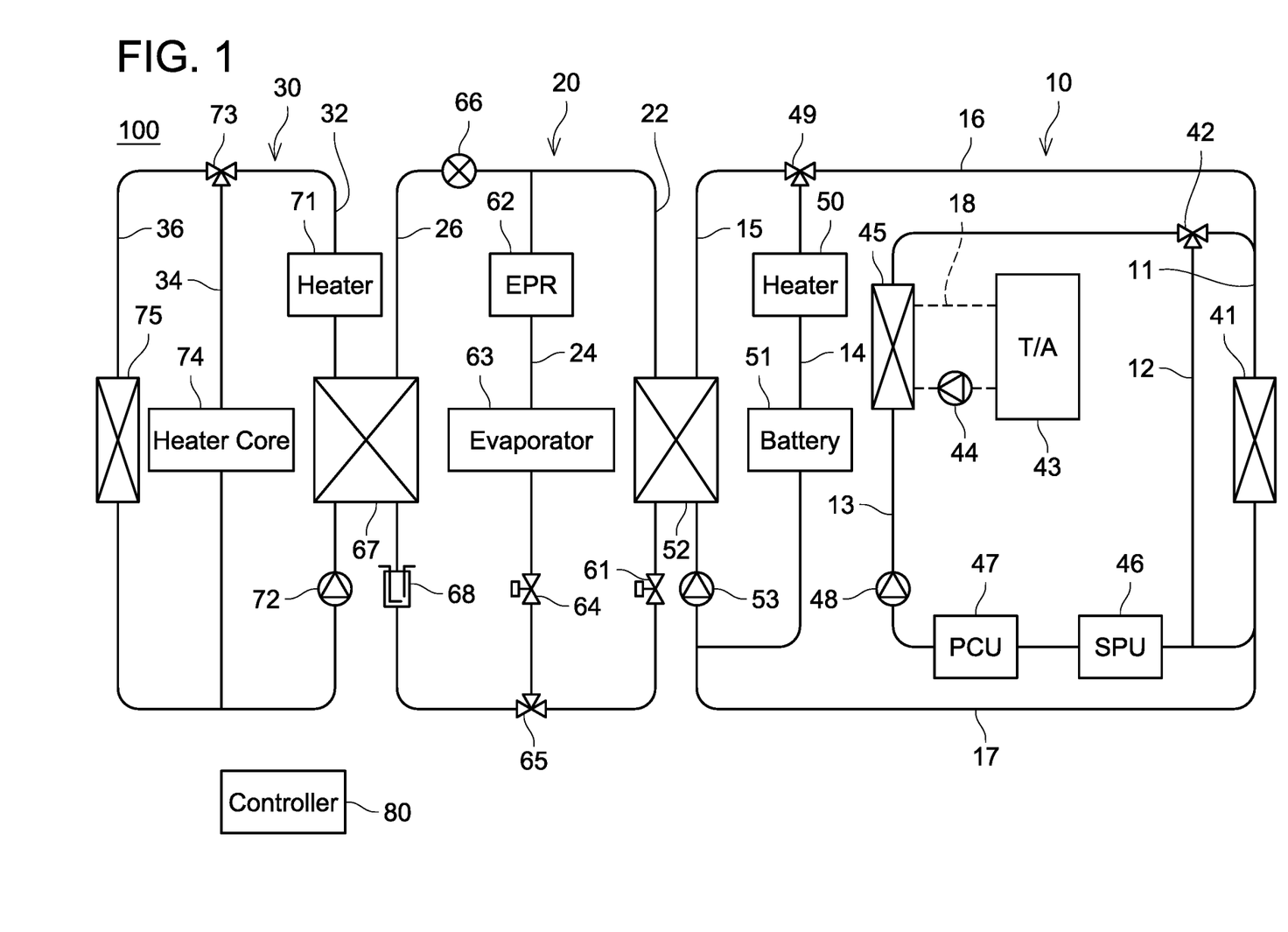
FIG. 1 is a circuit diagram of a heat management device according to embodiments.

A heat management device 100 according to an embodiment shown in FIG. 1 includes a first heat circuit 10, a second heat circuit 20, and a third heat circuit 30. Heat media respectively flow in the first heat circuit 10, the second heat circuit 20, and the third heat circuit 30. Respective channels of the first heat circuit 10, the second heat circuit 20, and the third heat circuit 30 in which the heat media flow are independent from each other. The respective heat media in the first heat circuit 10, the second heat circuit 20, and the third heat circuit 30 may be constituted of the same material or different materials. Hydrofluorocarbons can be used as the heat media, for example. The heat management device 100 is configured to be mounted on a vehicle. The heat management device 100 can execute an air-cooling operation of cooling air in a vehicle cabin by using an evaporator 63. Moreover, the heat management device 100 can execute an air-heating operation of heating the air in the vehicle cabin by using a heater core 74. The heat management device 100 can cool a battery 51, a transaxle 43, a power control unit (PCU) 47, and a smart power unit (SPU) 46.

The first heat circuit 10 includes a low-temperature radiator passage 11, a bypass passage 12, an electrical apparatus passage 13, a battery passage 14, a chiller passage 15, a connection passage 16, and a connection passage 17.

A low-temperature radiator 41 is disposed in the low-temperature radiator passage 11. The low-temperature radiator 41 is configured to exchange heat between the heat medium in the low-temperature radiator passage 11 and outside air (i.e., air outside the vehicle). In a case where a temperature of the outside air is lower than the temperature of the heat medium in the low-temperature radiator passage 11, the heat medium in the low-temperature radiator passage 11 is cooled by the low-temperature radiator 41. In a case where the temperature of the outside air is higher than the temperature of the heat medium in the low-temperature radiator passage 11, the heat medium in the low-temperature radiator passage 11 is heated by the low-temperature radiator 41.

A downstream end of the electrical apparatus passage 13 is connected to an upstream end of the bypass passage 12 and an upstream end of the low-temperature radiator passage 11 via a three-way valve 42. An upstream end of the electrical apparatus passage 13 is connected to a downstream end of the bypass passage 12 and a downstream end of the low-temperature radiator passage 11. A pump 48 is disposed in the electrical apparatus passage 13. The pump 48 pumps out the heat medium in the electrical apparatus passage 13 downstream. The three-way valve 42 is configured to switch channels to switch states between a state where the heat medium flows from the electrical apparatus passage 13 to the low-temperature radiator passage 11 and a state where the heat medium flows from the electrical apparatus passage 13 to the bypass passage 12. When the pump 48 operates while the three-way valve 42 is controlled such that the heat medium flows from the electrical apparatus passage 13 to the low-temperature radiator passage 11, the heat medium circulates in a circulation channel configured with the electrical apparatus passage 13 and the low-temperature radiator passage 11. When the pump 48 operates while the three-way valve 42 is controlled such that the heat medium flows from the electrical apparatus passage 13 to the bypass passage 12, the heat medium circulates in a circulation channel configured with the electrical apparatus passage 13 and the bypass passage 12.

The SPU 46, the PCU 47, and an oil cooler 45 are disposed in the electrical apparatus passage 13. The SPU 46 and the PCU 47 are disposed upstream of the pump 48, and the oil cooler 45 is disposed downstream of the pump 48. The SPU 46 and the PCU 47 are configured to be cooled by heat exchange with the heat medium in the electrical apparatus passage 13. The oil cooler 45 is a heat exchanger. An oil-circulation path 18 is connected to the oil cooler 45. The oil cooler 45 cools oil in the oil-circulation path 18 by heat exchange between the heat medium in the electrical apparatus passage 13 and the oil in the oil-circulation path 18. The oil-circulation path 18 is disposed to pass through the transaxle 43. The transaxle 43 has a motor built therein. The motor built in the transaxle 43 is a traction motor configured to rotate a drive wheel of the vehicle. A part of the oil-circulation path 18 is configured with a sliding portion (i.e., a bearing) of the motor. In other words, the oil in the oil-circulation path 18 is lubricating oil for the inside of the motor. An oil pump 44 is disposed in the oil-circulation path 18. The oil pump 44 circulates the oil in the oil-circulation path 18. When the oil cooled by the oil cooler 45 circulates in the oil-circulation path 18, the motor built in the transaxle 43 is cooled. The SPU 46 controls charging and discharging of the battery 51. The PCU 47 converts DC power provided from the battery 51 into AC power and provides the AC power to the motor built in the transaxle 43.

A downstream end of the chiller passage 15 is connected to an upstream end of the battery passage 14 and an upstream end of the connection passage 16 via a three-way valve 49. An upstream end of the chiller passage 15 is connected to a downstream end of the battery passage 14 and a downstream end of the connection passage 17. In other words, the battery passage 14 communicates with the chiller passage 15 by bypassing the low-temperature radiator passage 11. An upstream end of the connection passage 17 is connected to a downstream end of the connection passage 16 by the low-temperature radiator passage 11. A pump 53 is disposed in the chiller passage 15. The pump 53 is configured to pump out the heat medium in the chiller passage 15 downstream. The three-way valve 49 is configured to switch channels to switch states among three states including a state where the heat medium flows from the chiller passage 15 to the battery passage 14, a state where the heat medium flows from the chiller passage 15 to the connection passage 16, and a state where the heat medium flows from the chiller passage 15 to both the battery passage 14 and the connection passage 16. When the pump 53 operates while the three-way valve 49 is controlled such that the heat medium flows from the chiller passage 15 to the battery passage 14, the heat medium circulates in a circulation channel configured with the chiller passage 15 and the battery passage 14. When the pump 53 operates while the three-way valve 49 is controlled such that the heat medium flows from the chiller passage 15 to the connection passage 16, the heat medium circulates in a circulation channel configured with the chiller passage 15, the connection passage 16, the low-temperature radiator passage 11, and the connection passage 17. When the pump 53 operates while the three-way valve 49 is controlled such that the heat medium flows from the chiller passage 15 to both the battery passage 14 and the connection passage 16, the heat medium circulates in both the circulation channel configured with the chiller passage 15 and the battery passage 14 and the circulation channel configured with the chiller passage 15, the connection passage 16, the low-temperature radiator passage 11, and the connection passage 17.

A chiller 52 is disposed in the chiller passage 15. The chiller 52 is disposed downstream of the pump 53. The chiller 52 is configured to cool the heat medium in the chiller passage 15 by heat exchange between the heat medium in the chiller passage 15 and the heat medium in the second heat circuit 20 (more specifically, in a chiller passage 22 described below).

A heater 50 and the battery 51 are disposed in the battery passage 14. The battery 51 is configured to provide DC power to the PCU 47. In other words, the battery 51 is configured to provide power via the PCU 47 to the motor built in the transaxle 43. The battery 51 is configured to be cooled by heat exchange with the heat medium in the battery passage 14. The heater 50 is disposed upstream of the battery 51. The heater 50 is an electric heater and heats the heat medium in the battery passage 14.

The second heat circuit 20 includes the chiller passage 22, an evaporator passage 24, and a condenser passage 26. A downstream end of the condenser passage 26 is connected to an upstream end of the chiller passage 22 and an upstream end of the evaporator passage 24 via a three-way valve 65. An upstream end of the condenser passage 26 is connected to a downstream end of the chiller passage 22 and a downstream end of the evaporator passage 24. A compressor 66 is disposed in the condenser passage 26. The compressor 66 supplies the heat medium in the condenser passage 26 downstream while compressing the heat medium. The three-way valve 65 switches channels to switch states between a state where the heat medium flows from the condenser passage 26 to the chiller passage 22 and a state where the heat medium flows from the condenser passage 26 to the evaporator passage 24. When the compressor 66 operates while the three-way valve 65 is controlled such that the heat medium flows from the condenser passage 26 to the chiller passage 22, the heat medium circulates in a circulation channel configured with the condenser passage 26 and the chiller passage 22. When the compressor 66 operates while the three-way valve 65 is controlled such that the heat medium flows from the condenser passage 26 to the evaporator passage 24, the heat medium circulates in a circulation channel configured with the condenser passage 26 and the evaporator passage 24.

A condenser 67 and a modulator 68 are disposed in the condenser passage 26. The condenser 67 is disposed downstream of the compressor 66, and the modulator 68 is disposed downstream of the condenser 67. The heat medium supplied by the compressor 66 is a high-temperature gas. The heat medium which is a high-temperature gas thus flows into the condenser 67. The condenser 67 is configured to cool the heat medium in the condenser passage 26 by heat exchange between the heat medium in the condenser passage 26 and the heat medium in the third heat circuit 30 (more specifically, in a condenser passage 32 described below). The heat medium in the condenser passage 26 condenses by being cooled in the condenser 67. The heat medium that has passed through the condenser 67 is therefore a low-temperature liquid. The heat medium which is a low-temperature liquid therefore flows into the modulator 68. The modulator 68 removes air bubbles from the heat medium which is a liquid.

An expansion valve 61 and the chiller 52 are disposed in the chiller passage 22. The chiller 52 is disposed downstream of the expansion valve 61. The heat medium that has passed through the modulator 68 (i.e., the heat medium that is a low-temperature liquid) flows into the expansion valve 61. The heat medium is decompressed as passing through the expansion valve 61. The heat medium that is a low-pressure and low-temperature liquid therefore flows into the chiller 52. The chiller 52 heats the heat medium in the chiller passage 22 and cools the heat medium in the chiller passage 15 by heat exchange between the heat medium in the chiller passage 22 and the heat medium in the chiller passage 15. In the chiller 52, the heat medium in the chiller passage 22 is heated to thereby evaporate. The heat medium in the chiller passage 22 thus efficiently absorbs heat from the heat medium in the chiller passage 15. The heat medium in the chiller passage 15 is thereby cooled efficiently. The heat medium in the chiller passage 22 that has passed through the chiller 52 (i.e., the heat medium that is a high-temperature gas) is compressed by the compressor 66 and transferred to the condenser 67.

An expansion valve 64, the evaporator 63, and an evaporator pressure regulator (EPR) 62 are disposed in the evaporator passage 24. The evaporator 63 is disposed downstream of the expansion valve 64, and the EPR 62 is disposed downstream of the evaporator 63. The heat medium that has passed through the modulator 68 (i.e., the heat medium that is a low-temperature liquid) flows into the expansion valve 64. The heat medium is decompressed when passing through the expansion valve 64. The heat medium that is a low-pressure and low-temperature liquid therefore flows into the evaporator 63. The evaporator 63 heats the heat medium and cools the air in the vehicle cabin by heat exchange between the heat medium in the evaporator passage 24 and the air in the vehicle cabin. In other words, the evaporator 63 executes air-cooling in the vehicle cabin. In the evaporator 63, the heat medium is heated by heat exchange to thereby evaporate. The heat medium thus efficiently absorbs heat from the air in the vehicle cabin. The air in the vehicle cabin is thereby cooled efficiently. The EPR 62 controls the flow rate of the heat medium in the evaporator passage 24 to control the pressure in the evaporator 63 to be approximately constant. The heat medium that has passed through the EPR 62 (i.e., the heat medium that is a high-temperature gas) is compressed by the compressor 66 and transferred to the condenser 67.

The third heat circuit 30 includes the condenser passage 32, a heater core passage 34, and a high-temperature radiator passage 36. A downstream end of the condenser passage 32 is connected to an upstream end of the heater core passage 34 and an upstream end of the high-temperature radiator passage 36 via a three-way valve 73. An upstream end of the condenser passage 32 is connected to a downstream end of the heater core passage 34 and a downstream end of the high-temperature radiator passage 36. A pump 72 is disposed in the condenser passage 32. The pump 72 pumps out the heat medium in the condenser passage 32 downstream. The three-way valve 73 switches channels to switch states between a state where the heat medium flows from the condenser passage 32 to the heater core passage 34 and a state where the heat medium flows from the condenser passage 32 to the high-temperature radiator passage 36. When the pump 72 operates while the three-way valve 73 is controlled such that the heat medium flows from the condenser passage 32 to the heater core passage 34, the heat medium circulates in a circulation channel configured with the condenser passage 32 and the heater core passage 34. When the pump 72 operates while the three-way valve 73 is controlled such that the heat medium flows from the condenser passage 32 to the high-temperature radiator passage 36, the heat medium circulates in a circulation channel configured with the condenser passage 32 and the high-temperature radiator passage 36.

The condenser 67 and a heater 71 are disposed in the condenser passage 32. The condenser 67 is disposed downstream of the pump 72, and the heater 71 is disposed downstream of the condenser 67. The condenser 67 heats the heat medium in the condenser passage 32 and cools the heat medium in the condenser passage 26 by heat exchange between the heat medium in the condenser passage 32 and the heat medium in the condenser passage 26. The heater 71 is an electric heater and heats the heat medium in the condenser passage 32.

The heater core 74 is disposed in the heater core passage 34. The heater core 74 is configured to heat the air in the vehicle cabin by heat exchange between the heat medium in the heater core passage 34 and the air in the vehicle cabin. In other words, the heater core 74 executes air-heating in the vehicle cabin.

A high-temperature radiator 75 is disposed in the high-temperature radiator passage 36. The high-temperature radiator 75 cools the heat medium in the high-temperature radiator passage 36 by heat exchange between the heat medium in the high-temperature radiator passage 36 and the outside air.

The heat management device 100 includes a controller 80. The controller 80 is configured to control each part of the heat management device 100.

Next, operations that the controller 80 can execute will be described. The controller 80 can execute an air-heating operation, an air-cooling operation, a battery-cooling operation, an electrical apparatus-cooling operation, and a radiator-heating process.

Figure 2:
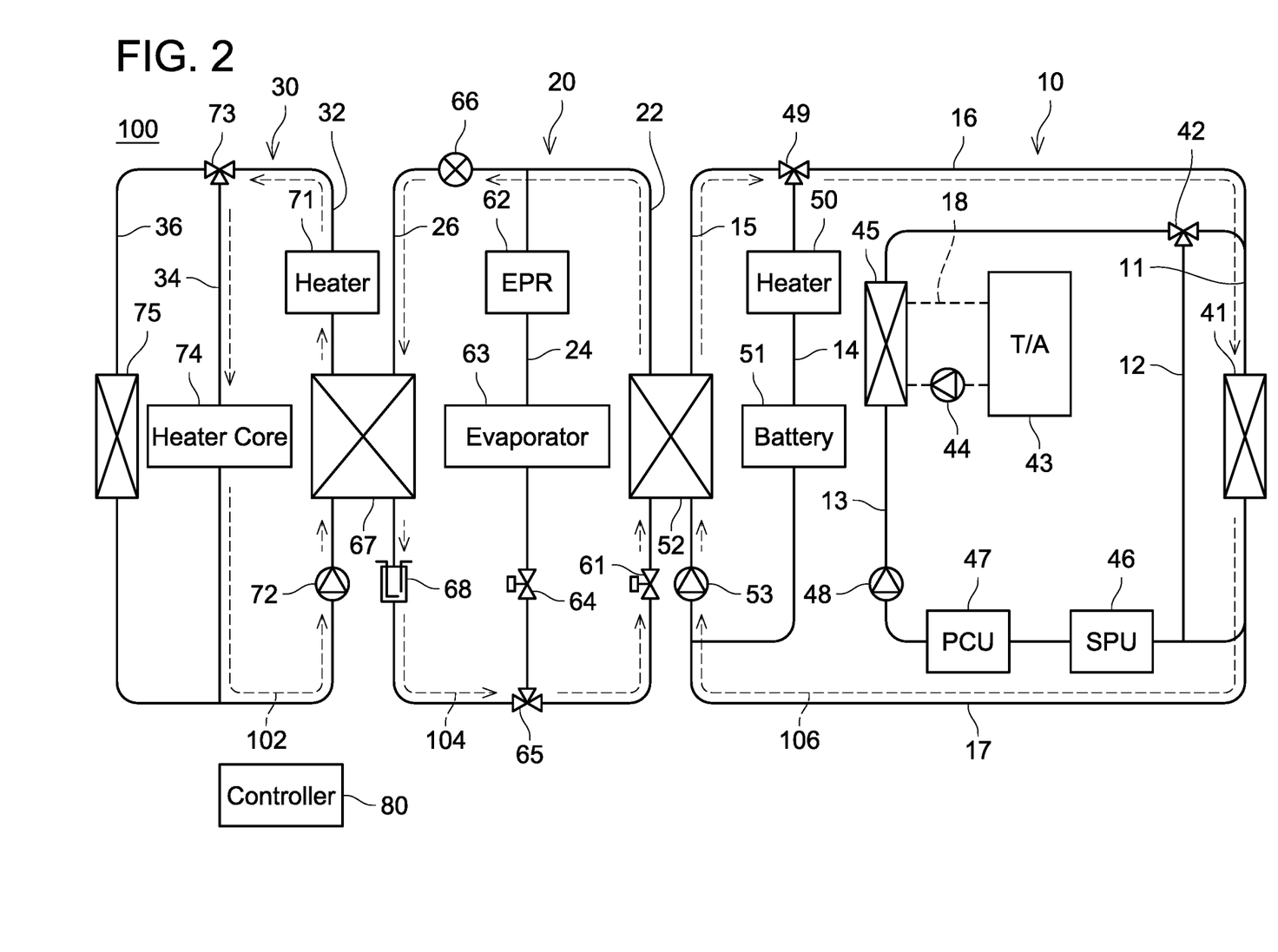
FIG. 2 is a circuit diagram showing an air-heating operation.

(Air-Heating Operation) In the air-heating operation, the controller 80 controls each part of the heat management device 100 as shown in FIG. 2. In the third heat circuit 30, the three-way valve 73 is controlled such that the heat medium flows from the condenser passage 32 to the heater core passage 34, and the pump 72 operates. The heat medium therefore circulates in a circulation channel 102 configured with the condenser passage 32 and the heater core passage 34. In the second heat circuit 20, the three-way valve 65 is controlled such that the heat medium flows from the condenser passage 26 to the chiller passage 22, and the compressor 66 operates. The heat medium therefore circulates in a circulation channel 104 configured with the condenser passage 26 and the chiller passage 22. In the first heat circuit 10, the three-way valve 49 is controlled such that the heat medium flows from the chiller passage 15 to the connection passage 16, and the pump 53 operates. The pump 48 is stopped. The heat medium therefore circulates in a circulation channel 106 configured with the chiller passage 15, the connection passage 16, the low-temperature radiator passage 11, and the connection passage 17.

In the circulation channel 106 in FIG. 2, the low-temperature heat medium cooled by the chiller 52 flows into the low-temperature radiator 41. The temperature of the heat medium flowing into the low-temperature radiator 41 is therefore lower than the temperature of the outside air. The heat medium is thus heated in the low-temperature radiator 41. Consequently, the high-temperature heat medium heated by the low-temperature radiator 41 flows into the chiller 52. In the chiller 52, the heat medium in the chiller passage 15 (i.e., the circulation channel 106) is cooled and the heat medium in the chiller passage 22 (i.e., the circulation channel 104) is heated. In the circulation channel 104, therefore, the high-temperature heat medium heated by the chiller 52 flows into the condenser 67. In the condenser 67, the heat medium in the condenser passage 26 (i.e., the circulation channel 104) is cooled and the heat medium in the condenser passage 32 (i.e., the circulation channel 102) is heated. In the circulation channel 102, therefore, the high-temperature heat medium heated by the condenser 67 flows into the heater core 74. The heater core 74 heats the air in the vehicle cabin by heat exchange between the heat medium in the circulation channel 102 and the air in the vehicle cabin. The air heated by the heater core 74 is blown by a fan (not shown). As described above, the air in the vehicle cabin is heated. As is clear from the description above, heat is provided to the heater core 74 via the heat medium in the circulation channel 104 (i.e., the heat medium in the second heat circuit 20). In other words, in the air-heating operation, the heater core 74 heats the air in the cabin of the vehicle using heat of the heat medium in the second heat circuit 20 as a heat source.

Figure 3:
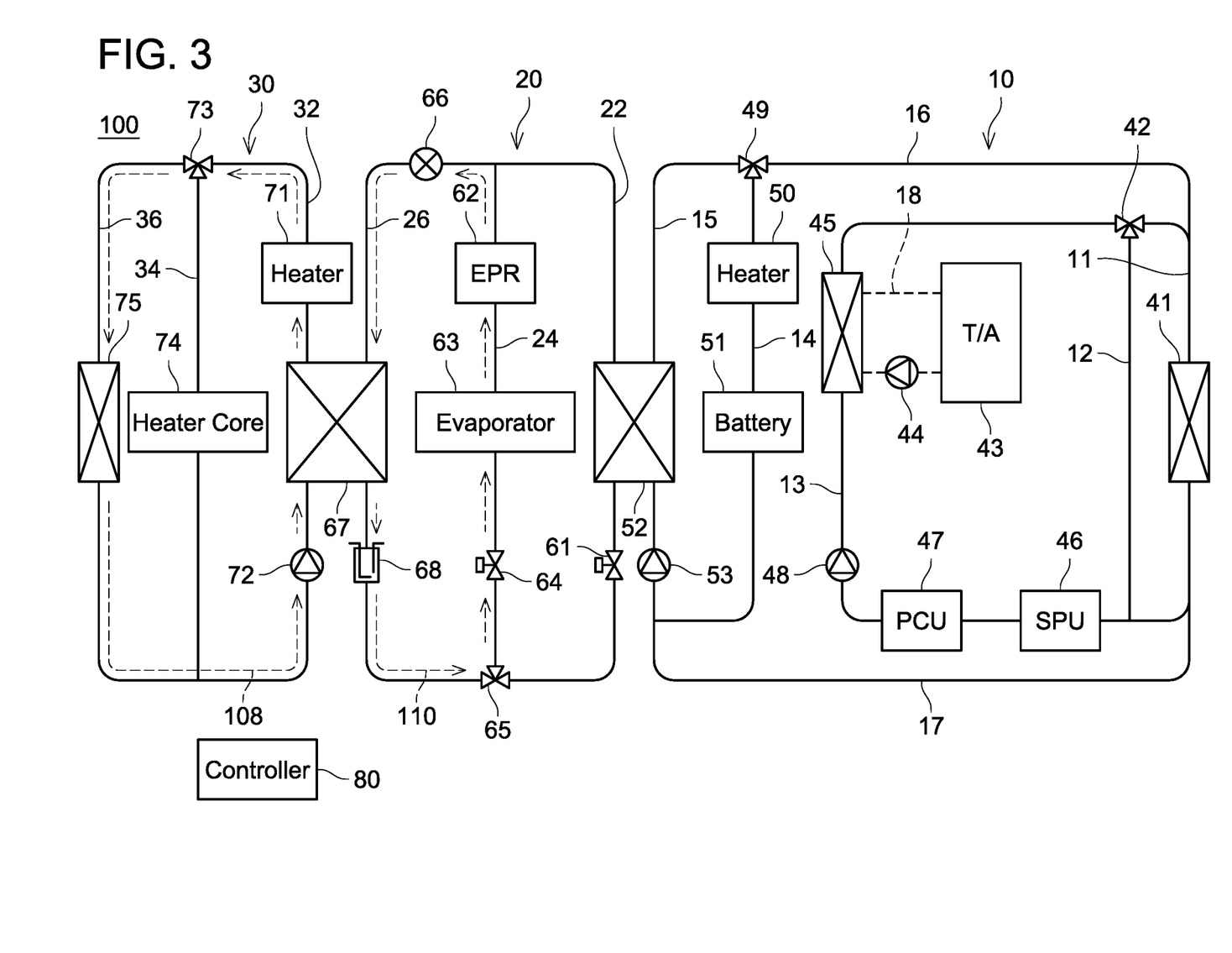
FIG. 3 is a circuit diagram showing an air-cooling operation.

(Air-Cooling Operation) In the air-cooling operation, the controller 80 controls each part of the heat management device 100 as shown in FIG. 3. In the third heat circuit 30, the three-way valve 73 is controlled such that the heat medium flows from the condenser passage 32 to the high-temperature radiator passage 36, and the pump 72 operates. The heat medium therefore circulates in a circulation channel 108 configured with the condenser passage 32 and the high-temperature radiator passage 36. In the second heat circuit 20, the three-way valve 65 is controlled such that the heat medium flows from the condenser passage 26 to the evaporator passage 24, and the compressor 66 operates. The heat medium therefore circulates in a circulation channel 110 configured with the condenser passage 26 and the evaporator passage 24. The first heat circuit 10 is not involved in the air-cooling operation.

In the circulation channel 108 in FIG. 3, the high-temperature heat medium heated by the condenser 67 flows into the high-temperature radiator 75. The temperature of the heat medium that flows into the high-temperature radiator 75 is therefore higher than the temperature of the outside air. The heat medium is thus cooled in the high-temperature radiator 75. Consequently, the low-temperature heat medium cooled by the high-temperature radiator 75 flows into the condenser 67. In the condenser 67, the heat medium in the condenser passage 32 (i.e., the circulation channel 108) is heated and the heat medium in the condenser passage 26 (i.e., the circulation channel 110) is cooled. Thus, in the circulation channel 110, the low-temperature heat medium cooled by the condenser 67 flows into the evaporator 63. The evaporator 63 cools the air in the vehicle cabin by heat exchange between the heat medium in the circulation channel 110 and the air in the vehicle cabin. The air cooled by the evaporator 63 is blown by a fan (not shown). As described above, the operation of cooling the air in the vehicle cabin is executed.

Figure 4:
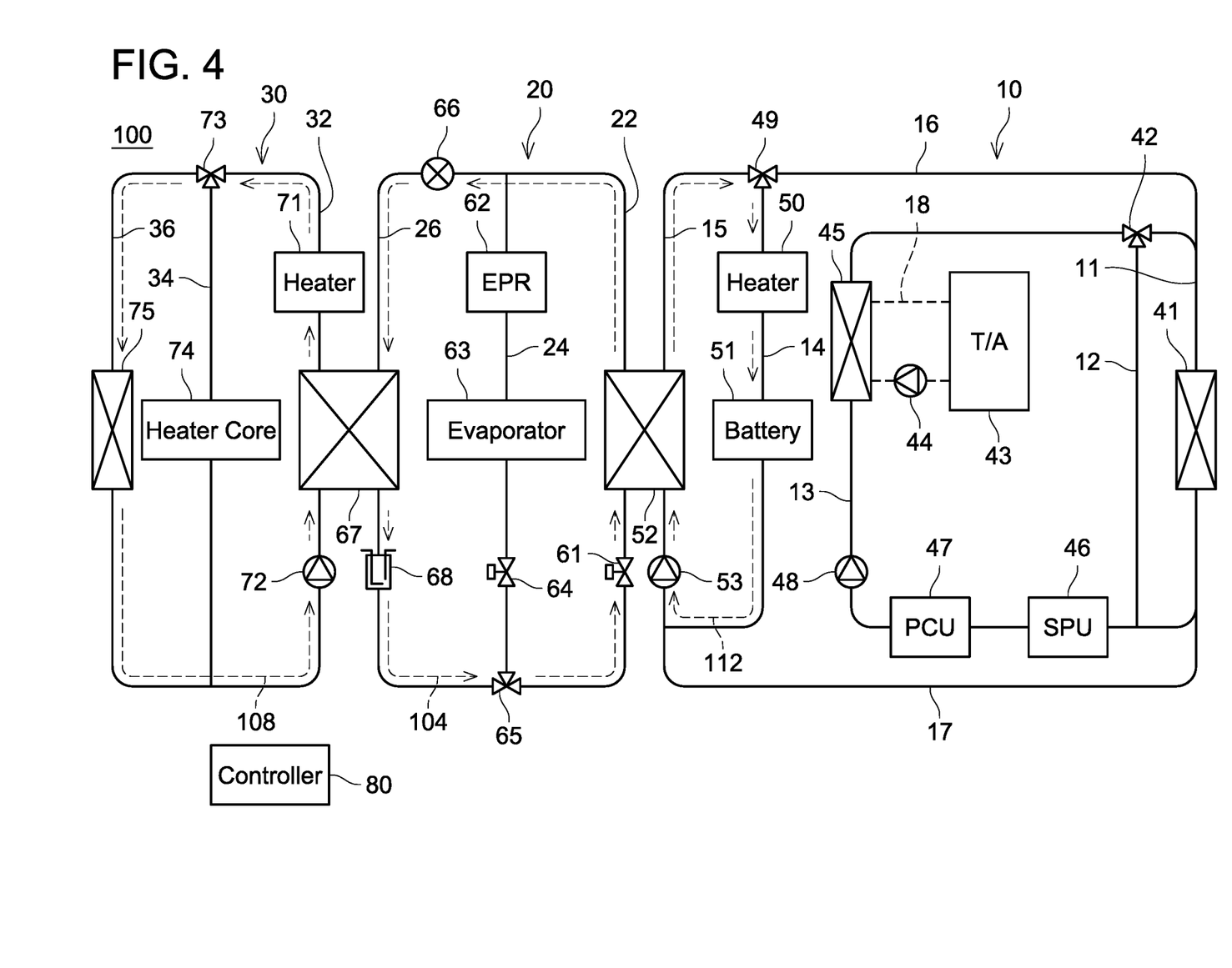
FIG. 4 is a circuit diagram showing a battery-cooling operation.

(Battery-Cooling Operation) The battery-cooling operation is executed when the temperature of the battery 51 rises to a temperature higher than or equal to a reference value. In the battery-cooling operation, the controller 80 controls each part of the heat management device 100 as shown in FIG. 4. In the third heat circuit 30, the three-way valve 73 and the pump 72 are controlled such that the heat medium circulates in the circulation channel 108 configured with the condenser passage 32 and the high-temperature radiator passage 36. In the second heat circuit 20, the three-way valve 65 and the compressor 66 are controlled such that the heat medium circulates in the circulation channel 104 configured with the condenser passage 26 and the chiller passage 22. In the first heat circuit 10, the three-way valve 49 is controlled such that the heat medium flows from the chiller passage 15 to the battery passage 14, and the pump 53 operates. The heat medium therefore circulates in a circulation channel 112 configured with the chiller passage 15 and the battery passage 14.

The circulation channel 108 in FIG. 4 operates as in FIG. 3 (i.e., in the air-cooling operation). The heat medium in the condenser passage 26 (i.e., the circulation channel 104) is therefore cooled by the condenser 67. In the circulation channel 104, therefore, the low-temperature heat medium cooled by the condenser 67 flows into the chiller 52. In the chiller 52, the heat medium in the chiller passage 22 (i.e., the circulation channel 104) is heated and the heat medium in the chiller passage 15 (i.e., the circulation channel 112) is cooled. In the circulation channel 112, therefore, the low-temperature heat medium cooled by the chiller 52 flows into the battery passage 14, and the battery 51 is thereby cooled. As described above, the operation of cooling the battery 51 is executed.

In the battery-cooling operation, the heat medium may flow in the heater core passage 34 in place of the high-temperature radiator passage 36. In this case, the heater core 74 cools the heat medium in the third heat circuit 30 and heats the air in the vehicle cabin. In this operation, the battery 51 is cooled and the air in the vehicle cabin is heated by the heater core 74 using waste heat generated from the battery 51.

Figure 5:
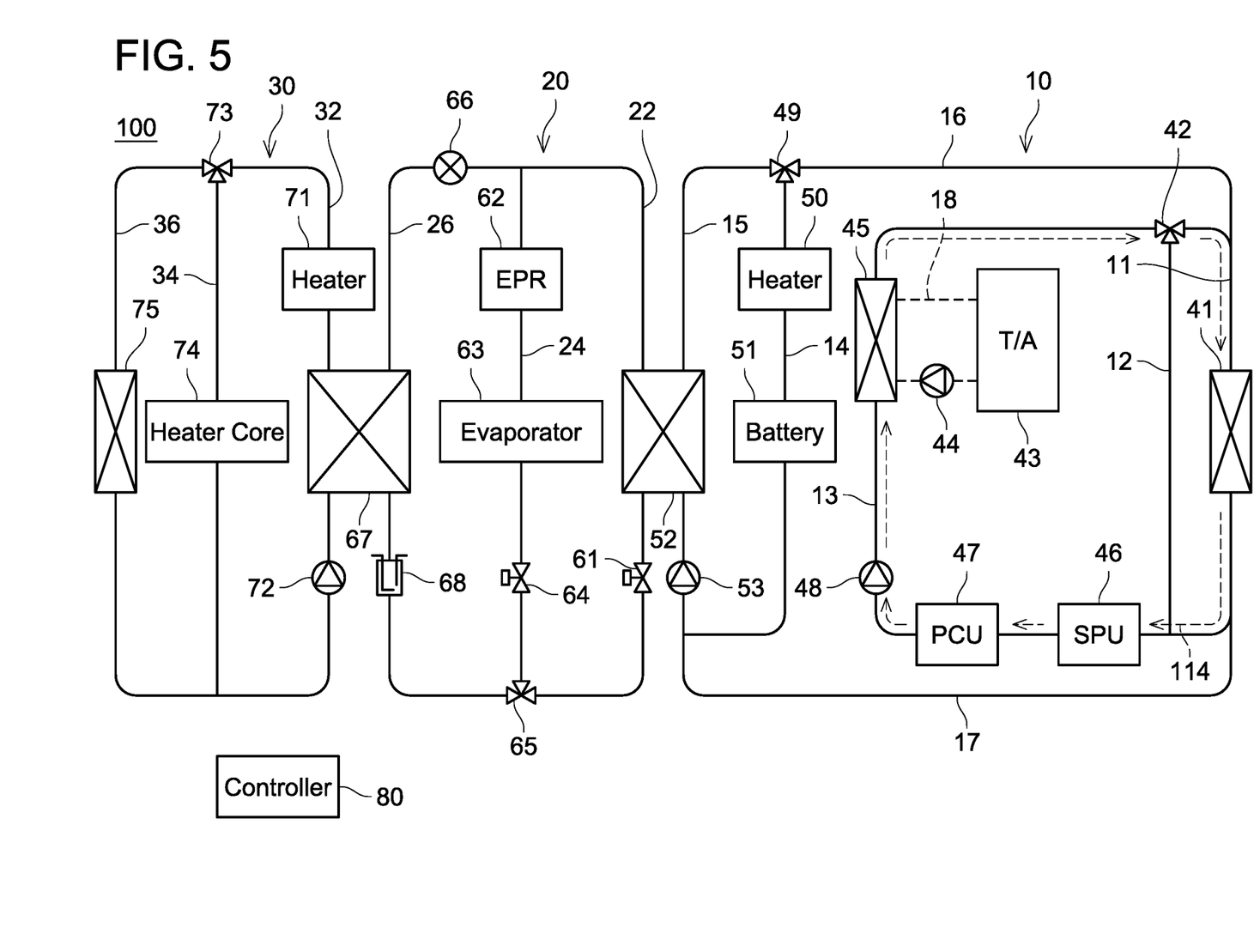
FIG. 5 is a circuit diagram showing an electrical apparatus-cooling operation.

(Electrical Apparatus-Cooling Operation) The electrical apparatus-cooling operation is executed while the SPU 46, the PCU 47, and the motor built in the transaxle 43 operate. The electrical apparatus-cooling operation may be executed when the temperature of at least one of the SPU 46, the PCU 47, and the motor exceeds a reference value. In the electrical apparatus-cooling operation, the controller 80 controls each part of the heat management device 100 as shown in FIG. 5. Neither the third heat circuit 30 nor the second heat circuit 20 is involved in the electrical apparatus-cooling operation. In the first heat circuit 10, the three-way valve 42 is controlled such that the heat medium flows from the electrical apparatus passage 13 to the low-temperature radiator passage 11, and the pump 48 operates. The heat medium therefore circulates in a circulation channel 114 configured with the electrical apparatus passage 13 and the low-temperature radiator passage 11. In the electrical apparatus-cooling operation, the oil pump 44 operates and the oil in the oil-circulation path 18 circulates.

In the circulation channel 114, the high-temperature heat medium heated by the SPU 46, the PCU 47, and the oil cooler 45 flows into the low-temperature radiator 41. The temperature of the heat medium that flows into the low-temperature radiator 41 is therefore higher than the temperature of the outside air. The heat medium in the low-temperature radiator passage 11 (i.e., the circulation channel 114) is thus cooled by the low-temperature radiator 41. In the circulation channel 114, therefore, the low-temperature heat medium cooled by the low-temperature radiator 41 flows into the electrical apparatus passage 13, and hence the SPU 46 and the PCU 47 are cooled. The oil cooler 45 cools the oil in the oil-circulation path 18 with the low-temperature heat medium. Consequently, the cooled oil is provided to the motor built in the transaxle 43, and the motor is thereby cooled. As described above, the electrical apparatus-cooling operation to cool the electrical apparatus (i.e., the SPU 46, the PCU 47, and the motor) is executed.

As described above, the circulation channel 112 formed in the first heat circuit 10 in the battery-cooling operation does not include the low-temperature radiator passage 11. In other words, the circulation channel 112 bypasses the low-temperature radiator passage 11. Moreover, the circulation channel 114 formed in the first heat circuit 10 in the electrical apparatus-cooling operation does not include the chiller passage 15. In other words, the circulation channel 114 bypasses the chiller passage 15. The battery-cooling operation and the electrical apparatus-cooling operation can therefore be executed independently with no interference between the circulation channel 112 and the circulation channel 114. For example, the battery-cooling operation can be executed without execution of the electrical apparatus-cooling operation, the electrical apparatus-cooling operation can be executed without execution of the battery-cooling operation, and the battery-cooling operation and the electrical apparatus-cooling operation can be executed simultaneously. Since the circulation channel 112 bypasses the electrical apparatus passage 13 and the circulation channel 114 bypasses the battery passage 14, the circulation channel 112 and the circulation channel 114 can be separated completely.

The circulation channel 106 formed in the first heat circuit 10 in the air-heating operation includes neither the battery passage 14 nor the electrical apparatus passage 13. In other words, the circulation channel 106 bypasses the battery passage 14 and the electrical apparatus passage 13. This prevents the temperature of the heat medium in the circulation channel 106 from lowering during the air-heating operation due to heat exchange with apparatus not involved in the air-heating operation. The air-heating operation can thereby be executed with higher efficiency.

(Radiator-Heating Process)

Figure 6:
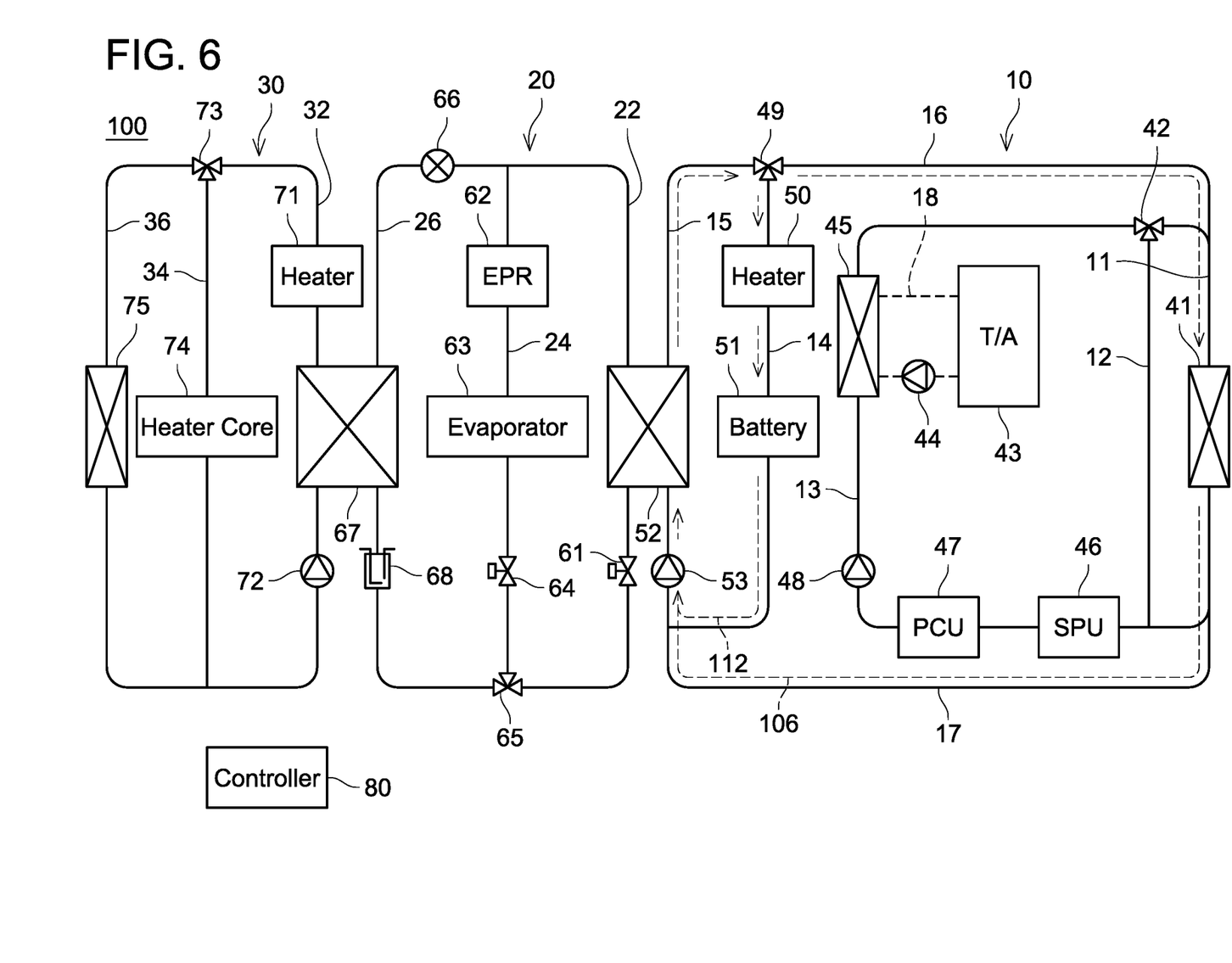
FIG. 6 is a circuit diagram showing a radiator-heating process.

The radiator-heating process is executed in a case where a condition is established by a radiator heating-determination process to be described below. Frost on the low-temperature radiator 41 is thereby removed.

In the radiator-heating process, the controller 80 controls each part of the heat management device 100 as shown in FIG. 6. Neither the second heat circuit 20 nor the third heat circuit 30 is not involved in the radiator-heating process. In the first heat circuit 10, the three-way valve 49 is controlled such that the heat medium flows from the chiller passage 15 to both the battery passage 14 and the connection passage 16, and the pump 53 operates. Therefore, both the state where the heat medium circulates in the circulation channel 112 configured with the chiller passage 15 and the battery passage 14 and the state where the heat medium circulates in the circulation channel 106 configured with the chiller passage 15, the connection passage 16, the low-temperature radiator passage 11, and the connection passage 17 are established in parallel.

In the radiator-heating process, a heating operation of heating the heat medium that flows in the battery passage 14 by the battery 51 is executed in the circulation channel 112, while the battery 51 is cooled. The heat medium heated by the battery 51 in the heating operation passes through the three-way valve 49 and flows into the connection passage 16. In the circulation channel 106, a circulation operation in which the heat medium heated by the battery 51 flows into the low-temperature radiator 41 is executed. The low-temperature radiator 41 is thereby heated by the heat medium, while the heat medium is cooled. Consequently, the frost on the low-temperature radiator 41 melts. As described above, defrosting of the low-temperature radiator 41 is executed.

(Radiator Heating-Determination Process)

Figure 7:
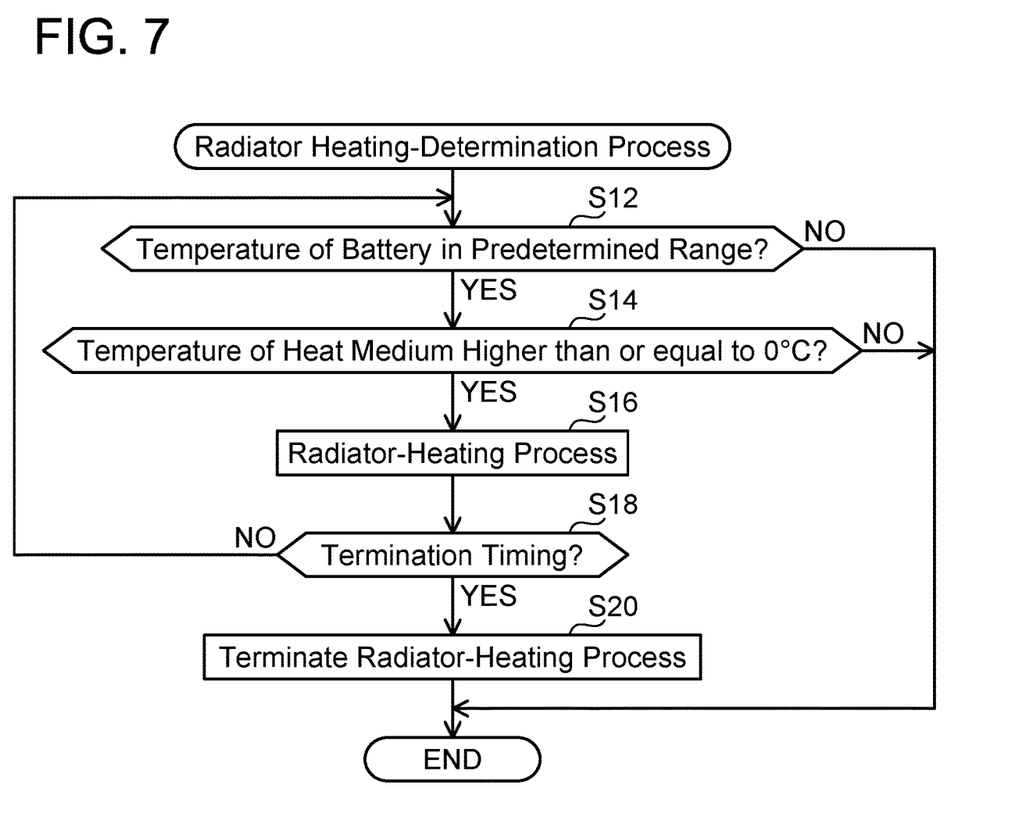
FIG. 7 is a flowchart of a radiator heating-determination process.

Next, with reference to FIG. 7, the radiator heating-determination process executed by the controller 80 will be described. The radiator-heating process is executed when a defrosting condition is established. The defrosting condition is established when the above-mentioned air-heating operation is executed for a predetermined period or longer. In the air-heating operation, electric power of the battery 51 is utilized. Consequently, the battery 51 generates heat, and the heat is stored in the battery 51. On the other hand, in the air-heating operation, the heat medium cooled by the chiller 52 flows through the circulation channel 106 and flows into the low-temperature radiator 41. Consequently, the low-temperature radiator 41 may be frosted. In addition to or in place of the above-described condition, the defrosting condition may be established in a case where the temperature of the outside air is lower than or equal to a predetermined temperature (e.g., 0° C.).

When the defrosting condition is established, the controller 80 initially determines, in S12, whether the temperature of the battery 51 is in a predetermined range. The battery 51 may decrease in performance and resistance depending on its temperature when in use. Thus, in a case where the temperature of the battery 51 is out of a specific temperature range, input of electric power to the battery 51 and output of electric power from the battery 51 are restricted. The predetermined range is a specific temperature range, and is, for example, from 15° C. to 47° C. This configuration can prevent a situation where, while the battery 51 is under the restricted state, cooling of the battery 51 hinders the battery 51 from recovering from the restriction.

In a variant, the predetermined range is not limited to the above-described range. For example, a lower limit of the predetermined range may or may not be set. In a case where the lower limit is set, it may be higher than or equal to 0° C., or may be a temperature of any of 1° C., 2° C., 3° C., 4° C., 5° C., 6° C., 7° C., 8° C., 9° C., 10° C., 11° C., 12° C., 13° C., 14° C., and 15° C. Moreover, an upper limit of the predetermined range may or may not be set. In a case where the upper limit is set, it only needs to be greater than the lower limit. The upper limit may be, for example, any temperature from 40° C. to 60° C., or may be a temperature of any of 45° C., 46° C., 47° C., 48° C., 49° C., 50° C., 51° C., 52° C., 53° C., 54° C., 55° C., 56° C., 57° C., 58° C., 59° C., and 60° C.

In a case where the temperature of the battery 51 is out of the predetermined range (NO in S12), the radiator heating-determination process terminates. The processes from S14 are thereby prohibited in the case where the temperature of the battery 51 is not in the predetermined range. The radiator heating process is thereby prohibited. On the other hand, in a case where the temperature of the battery 51 is in the predetermined range (YES in S12), the controller 80 determines whether the temperature of the heat medium is higher than or equal to 0° C. in S14. In a case where the temperature of the heat medium is less than 0° C. (NO in S14), the radiator heating-determination process terminates. The processes from S16 are thereby prohibited in the case where the temperature of the heat medium is less than 0° C. In the case where the temperature of the heat medium is less than 0° C., frost on the low-temperature radiator 41 cannot be melt even if the heat medium flows into the low-temperature radiator 41. In the radiator heating-determination process, the radiator-heating process is not executed in the case where the temperature of the heat medium is less than 0° C. This configuration eliminates the need to execute the radiator-heating process in a circumstance where the frost on the low-temperature radiator 41 is unlikely to melt. In a variant, the controller 80 may control the three-way valve 49 before executing S14 such that the heat medium flows from the chiller passage 15 to the battery passage 14 to thereby circulate the heat medium in the circulation channel 112 only for a predetermined period. The process in S14 may thereby be executed after the heat medium is heated by the battery 51. In other words, in the case where the temperature of the heat medium is less than 0° C., the heating operation in which the heat medium that flows in the battery passage 14 is heated by the battery 51 may be executed in the circulation channel 112 while the circulation operation in which the heat medium heated by the battery 51 flows into the low-temperature radiator 41 may be prohibited.

In the case where the temperature of the heat medium is higher than or equal to 0° C. (YES in S14), the controller 80 executes the radiator-heating process in S16. The controller 80 subsequently determines in S18 whether a termination timing for the radiator heating process has arrived. The termination timing arrives when, for example, a predetermined period has elapsed after the radiator-heating process was started in S16. The predetermined period may be a fixed period, or may be a variable period that varies depending on the temperature of the outside air, the temperature of the heat medium, and the like. In the latter case, the controller 80 may store data representing a relation between a predetermined period and a temperature of the outside air, a temperature of the heat medium, and the like, which is predetermined in advance by experiment or simulation.

Ina case where the termination timing has not yet been arrived (NO in S18), the controller 80 returns to S12. On the other hand, in the case where the termination timing has arrived (YES in S18), the controller 80 terminates the radiator-heating process in S20, and the radiator heating-determination process is terminated.

The controller 80 can also execute operation(s) other than the above-mentioned operations and radiator-heating process. For example, the controller 80 can execute an operation to heat the battery 51 by causing the heater 50 to heat the heat medium while circulating the heat medium in the circulation channel 112. This operation is executed when the battery 51 reaches an excessively low temperature in, for example, a cold climate area. Moreover, the controller 80 can execute an operation to heat and defrost the low-temperature radiator 41 by causing the heater 50 to heat the heat medium while circulating the heat medium in the circulation channel 112. This operation is executed in a case where the radiator-heating process is not executed (i.e., in a case of NO in S12 or NO in S14). Furthermore, the controller 80 can execute air-heating by the heater core 74 by causing the heater 71 to heat the heat medium while circulating the heat medium in the circulation channel 102. This operation is executed when the above-mentioned air-heating operation cannot be executed. Moreover, the controller 80 can execute an operation to prevent temperatures of the SPU 46, the PCU 47, and the motor from rising by circulating the heat medium in the circulation channel configured with the electrical apparatus passage 13 and the bypass passage 12.

With the heat management device 100, the radiator-heating process enables heating of the low-temperature radiator 41 by utilizing heat energy generated when the battery 51 is used. This eliminates the need to generate heat energy only for defrosting the low-temperature radiator 41. The battery 51, which is configured to supply electric power to the traction motor for the vehicle, has a heat capacity larger than that of other equipment mounted on the vehicle (e.g., the PCU 47). The temperature of the battery 51 is thus less likely to decrease once it rises. Thus, after the temperature of the battery 51 rises because of, for example, charging of the battery 51 or high-load driving of the vehicle, the battery 51 can store sufficient heat energy for defrosting. The heat management device 100 utilizes the heat energy stored in the battery 51, and hence can prevent a situation in which defrosting by the radiator-heating process cannot be executed owing to insufficient heat energy.

Second Embodiment

Features different from the first embodiment will be described. In the heat management device 100 according to the present embodiment, the three-way valve 49 is alternately switched. in the radiator-heating operation, to switch states between the state where the heat medium flows from the chiller passage 15 to the battery passage 14 and the state where the heat medium flows from the chiller passage 15 to the connection passage 16. This allows, in the radiator-heating process, states to be alternately switched between the state where the heat medium circulates in the circulation channel 112 and the state where the heat medium circulates in the circulation channel 106. This enables execution of the heating operation and the circulation operation. The heating operation is an operation in which circulation of the heat medium in the circulation channel 112 allows the heat medium to be heated in the battery 51. The circulation operation is an operation in which circulation of the heat medium in the circulation channel 106 allows the heat medium that flows into the low-temperature radiator 41 to be cooled by which the frost on the low-temperature radiator 41 melts. In the present embodiment, the three-way valve 49 may switch channels to switch states between the state where the heat medium flows from the chiller passage 15 to the battery passage 14 and the state where the heat medium flows from the chiller passage 15 to the connection passage 16, and does not need to switch to the state where the heat medium flows from the chiller passage 15 to both the battery passage 14 and the connection passage 16.

(Corresponding Relationships)

The first heat circuit 10 is an example of "heat circuit". The chiller 52 is an example of "heat exchanger", the three-way valve 49 is an example of "control valve", the pump 53 is an example of "pump", and the low-temperature radiator 41 is an example of "radiator".

Specific examples of the present disclosure have been described in detail, however, these are mere exemplary indications and thus do not limit the scope of the claims. The art described in the claims include modifications and variations of the specific examples presented above.

In the above-described embodiments, the three-way valve 49 is disposed in the first heat circuit 10. However, the first heat circuit 10 only needs to be provided with a valve that can at least switch states between the state where the heat medium flows from the chiller passage 15 to the battery passage 14 and the state where the heat medium flows from the chiller passage 15 to the connection passage 16. For example, the three-way valve 49 may be replaced by on-off valves configured to respectively switch the battery passage 14 and the connection passage 16 between a communicating state and a closed state. In this case, the on-off valves are examples of the "control valve". The controller 80 may switch states between the state where the heat medium flows from the chiller passage 15 to the battery passage 14 and the state where the heat medium flows from the chiller passage 15 to the connection passage 16 by using two on-off valves, or may switch channels to switch states among the three states including the state where the heat medium flows from the chiller passage 15 to the battery passage 14, the state where the heat medium flows from the chiller passage 15 to the connection passage 16, and the state where the heat medium flows from the chiller passage 15 to both the battery passage 14 and the connection passage 16.

In the above-mentioned embodiments, the pump 53 is disposed in the first heat circuit 10 and is operated in the radiator-heating process to thereby pumps out the heat medium. However, a plurality of pumps may be disposed in the first heat circuit 10. For example, a pump configured to circulate the heat medium in the circulation channel 112 and a pump configured to circulate the heat medium in the circulation channel 106 may be disposed individually.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A heat management device configured to be mounted on a vehicle, the heat management device comprising:
   a first heat circuit in which a heat medium circulates, the first heat circuit comprising a heat exchanger passage, a radiator passage communicating with the heat exchanger passage, and a battery passage communicating with the heat exchanger passage by bypassing the radiator passage, the radiator passage communicating with the heat exchanger passage by bypassing the battery passage;
   a heat exchanger configured to cool the heat medium in the heat exchanger passage by heat exchange;
   a battery disposed on the battery passage and configured to be cooled by the battery passage;
   a radiator configured to exchange heat between outside air and the heat medium in the radiator passage;
   a first control valve configured to change a channel of the heat medium in the first heat circuit;
   a first pump configured to pump out the heat medium in the first heat circuit from the heat exchanger passage to the battery passage and from the heat exchanger passage to the radiator passage; and
   a controller,
   wherein:
   the battery passage comprises an upstream end, a downstream end, a first section from the upstream end to the battery, and a second section from the battery to the downstream end;
   the heat exchanger passage is directly connected to the downstream end of the battery passage and to a downstream end of the radiator passage at an upstream end of the heat exchanger passage;
   a downstream end of the heat exchanger passage is directly connected via only the first control valve (i) to the upstream end of the battery passage and (ii) to an upstream end of the radiator passage;
   the controller is configured to execute:
      a heating operation by controlling the first control valve and the first pump such that the heat medium in the first heat circuit circulates between the heat exchanger passage and the battery passage so as to heat the heat medium in the battery passage by the battery; and
      a circulation operation by controlling the first control valve and the first pump such that the heat medium heated by the heating operation circulates between the heat exchanger passage and the radiator passage without passing through the battery passage so as to cool the heat medium in the radiator passage by the radiator;

the heat management device further comprises a second heat circuit and a third heat circuit;

the second heat circuit, in which a heat medium that is independent from the heat medium circulating in the first heat circuit circulates, comprises:
- a chiller passage, a first condenser passage communicating with the chiller passage, and an evaporator passage communicating with the first condenser passage by bypassing the chiller passage, the first condenser passage communicating with the chiller passage by bypassing the evaporator passage;
- a compressor disposed in the first condenser passage and configured to supply the heat medium in the first condenser passage downstream while compressing the heat medium in the first condenser passage;
- a condenser disposed in the first condenser passage downstream of the compressor and configured to cool the heat medium in the first condenser passage by heat exchange between the heat medium in the first condenser passage and a heat medium in the third heat circuit:
- a modulator disposed in the first condenser passage downstream of the condenser and configured to remove air bubbles from the heat medium in the first condenser passage;
- a first expansion valve disposed in the evaporator passage and configured to decompress the heat medium in the evaporator passage:
- an evaporator disposed in the evaporator passage downstream of the first expansion valve and configured to heat the heat medium in the evaporator passage and cool air in a vehicle cabin by heat exchange between the heat medium in the evaporator passage and the air in the vehicle cabin;
- an evaporator pressure regulator disposed in the evaporator passage downstream of the evaporator and configured to control flow rate of the heat medium in the evaporator passage to control the pressure in the evaporator to be approximately constant;
- a second expansion valve disposed in the chiller passage and configured to decompress the heat medium in the chiller passage; and
- a first three-way valve via which a downstream end of the first condenser passage is connected to an upstream end of the chiller passage and to an upstream end of the evaporator passage:

the heat exchanger is configured to cool the heat medium in the heat exchanger passage and heat the heat medium in the chiller passage by heat exchange between the heat medium in the heat exchanger passage and the heat medium in the chiller passage; and the controller is further configured to execute:
- a battery cooling operation (i) by controlling the first control valve and the first pump in the first heat circuit such that the heat medium in the first heat circuit circulates between the heat exchanger passage and the battery passage so as to heat the heat medium in the battery passage by the battery and (ii) by controlling the first three-way valve and the compressor in the second heat circuit such that the heat medium in the second heat circuit circulates between the chiller passage and the first condenser passage so as to cool the heat medium in the heat exchanger passage and heat the heat medium in the chiller passage by heat exchange between the heat medium in the heat exchanger passage and the heat medium in the chiller passage; and
- an air-cooling operation by controlling the first three-way valve and the compressor in the second heat circuit such that the heat medium in the second heat circuit circulates between the evaporator passage and the first condenser passage so as (i) to heat the heat medium in the first condenser passage and cool the heat medium in the third heat circuit and (ii) to heat the heat medium in the evaporator passage and cool the air in the vehicle cabin by heat exchange between the heat medium in the evaporator passage and the air in the vehicle cabin.

2. The heat management device of claim 1, wherein the controller is configured to prohibit the heating operation in a case where a temperature of the battery is out of a predetermined range, the predetermined range being greater than or equal to 0° C.

3. The heat management device of claim 2, wherein the controller is configured to prohibit the heating operation in a case where the temperature of the battery is less than 15° C.

4. The heat management device of claim 1, wherein the controller is configured to prohibit the circulation operation in a case where a temperature of the heat medium in the first heat circuit is less than 0° C.

5. The heat management device of claim 1, wherein the controller is configured to simultaneously execute the heating operation and the circulation operation by controlling the first control valve such that the heat medium in the first heat circuit flows from the heat exchanger passage to both the battery passage and the radiator passage.

6. The heat management device of claim 1, wherein the controller is configured to alternately execute the heating operation and the circulation operation by controlling the first control valve.

7. The heat management device of claim 1, wherein the third heat circuit, in which the heat medium independent from the heat medium circulating in the first heat circuit and the heat medium circulating in the second heat circuit circulates, comprises:
- a second condenser passage, a heater core passage communicating with second condenser passage, and a high-temperature radiator passage communicating with the second condenser passage by bypassing the heater core passage, the heater core passage communicating with the second condenser passage by bypassing the high-temperature radiator passage;
- a second pump disposed in the second condenser passage and configured to pump out the heat medium in the second condenser passage downstream;
- a heater disposed in the second condenser passage downstream of the second pump and the condenser, which is disposed in the second condenser passage, and configured to heat the heat medium in the second condenser passage;
- a heater core disposed in the heater core passage and configured to heat the air in the vehicle cabin by heat exchange between the heat medium in the heater core passage and the air in the vehicle cabin;
- a high-temperature radiator disposed in the high-temperature radiator passage and configured to cool the heat medium in the high-temperature radiator passage by heat exchange between the heat medium in the high-temperature radiator passage and the outside air; and a second three-way valve via which a downstream end of the second condenser passage is connected to an upstream end of the heater core passage and to an upstream end of the high-temperature radiator passage, and wherein the controller is configured to execute:

the air-cooling operation by controlling the second three-way valve and the second pump in the third heat circuit such that the heat medium in the third heat circuit circulates between the second condenser passage and the high-temperature radiator passage so as to cool the heat medium in the high-temperature radiator passage and heat the heat medium in the second condenser passage;

the battery cooling operation by controlling the second three-way valve and the second pump in the third heat circuit such that the heat medium in the third heat circuit circulates between the second condenser passage and the high-temperature radiator passage so as to cool the heat medium in the high-temperature radiator passage and heat the heat medium in the second condenser passage; and the heating operation (i) by controlling the first three-way valve and the compressor in the second heat circuit such that the heat medium in the second heat circuit circulates between the chiller passage and the first condenser passage so as to heat the heat medium in the chiller passage and (ii) by controlling the second three-way valve and the second pump in the third heat circuit such that the heat medium in the third heat circuit circulates between the second condenser passage and the heater core passage so as to heat the heat medium in the second condenser passage and heat the air in the vehicle cabin by heat exchange between the heat medium in the heater core passage and the air in the vehicle cabin.

* * * * *